| United States Patent [19] | [11] Patent Number: 4,711,833 |
| --- | --- |
| McAneney et al. | [45] Date of Patent: Dec. 8, 1987 |

[54] POWDER COATING PROCESS FOR SEAMLESS SUBSTRATES

[75] Inventors: T. Brian McAneney, Burlington; Rafik O. Loutfy, Willowdale, both of Canada; Joseph Mammino, Penfield, N.Y.; Deborah J. Nichol-Landry, Rochester, N.Y.; Donald S. Sypula, Pittsford, N.Y.

[73] Assignee: Xerox Corporation, Stamford, Conn.

[21] Appl. No.: 842,964

[22] Filed: Mar. 24, 1986

[51] Int. Cl.$^4$ .............................................. G03G 5/14
[52] U.S. Cl. .................................... 430/131; 264/1.4; 264/105; 264/213
[58] Field of Search ............... 264/1.4, 104, 105, 213, 264/DIG. 45; 355/3 BE; 430/130, 134, 131

[56] References Cited

U.S. PATENT DOCUMENTS

| 4,111,861 | 9/1978 | Godlewski | 264/300 |
| 4,143,024 | 3/1979 | Adelmann et al. | 264/300 |
| 4,169,903 | 10/1979 | Scholes | 118/621 |
| 4,337,220 | 6/1982 | Arimatsu | 430/120 |
| 4,481,273 | 11/1984 | Katagiri et al. | 430/134 |

Primary Examiner—John L. Goodrow
Attorney, Agent, or Firm—E. O. Palazzo

[57] ABSTRACT

A process for the fabrication of seamless substrates which comprises (1) providing a substrate with a release coating composition thereover; (2) depositing thereon by electrostatic powder spraying a polymer; (3) melting the polymer blend; and (4) subsequently permitting the melted blend to cool. Thereafter, layered photoconductive imaging members can be prepared by the application, for example, of a ground plane, a photogenerating layer, and a charge transport layer.

58 Claims, 2 Drawing Figures

POWDER COATING PROCESS FOR SEAMLESS SUBSTRATES

BACKGROUND OF THE INVENTION

The invention of the present application is generally directed to improved processes for affecting the preparation of seamless substrates, and more specifically, the present invention relates to powder coating processes for permitting the fabrication of flexible seamless substrates useful, for example, in the preparation of layered photoconductive imaging members. Accordingly, in one specific embodiment of the present invention there is provided a continuous process for the fabrication of flexible seamless substrates, and flexible seamless layered photoconductive imaging members comprised of photogenerating layers and aryl amine hole transport layers by accomplishing the powder coating of a polymeric material on a mandrel, and subsequently heating the deposited polymer. Another important embodiment of the present invention relates to the preparation of flexible seamless photoconductive imaging members wherein a seamless substrate is initially prepared by the powder coating process illustrated herein, and thereafter there is deposited thereon a photogenerating layer and a hole transport layer. With the simple economical and pollution hazard free process of the present invention, there also results uniform durable and resistant substrates suitable for selection after further processing as imaging members. Additionally, pollution hazards attendant to liquid spray coating processes wherein solvents are selected are eliminated with the elastrostatic spray powder caoting process of the present invention.

Numerous different processes are known for permitting the preparation of photoconductive imaging members, including the layered imaging members as illustrated in U.S. Pat. No. 4,265,990, the disclosure of which is totally incorporated herein by reference. In these processes, genreally a supporting substrate is provided, such as aluminized Mylar, and there is solution coated thereover a photogenerating layer comprised of, for example, trigonal selenium dispersed in an inactive resinous binder. Thereafter, a hole transport layer comprised of, for example, aryl diamine molecules dispersed in a resinous binder, is applied to the photogenerating layer by, for example, solvent coating processes. Other processes for accomplishing the preparation of layered photoresponsive imaging members include dip coating, vacuum coating, depositions with various applicators including Bird applicators, and solution spraying. In one commonly practiced prior art process, imaging members with seams therein are prepared by initially formulating the photoreceptor on a substrate such as aluminized Mylar, and subsequently cutting the resulting member into sections of the appropriate length, for example 120 centimeters long. Thereafter, the ends of each section can be ultrasonically welded providing a photoreceptor imaging belt with a seam therein.

A number of other patents are in existence describing layered photoresponsive imaging members such as, for example, U.S. Pat. No. 3,041,167 which illustrates an overcoated imaging member with a conductive substrate, a photoconductive layer, and an overcoating layer of an electrically insulating polymeric material. Layered imaging members similar to those disclosed in the present application are illustrated in U.S. Pat. Nos. 4,265,990, mentioned hereinbefore, and 4,251,612. These patents disclose photoresponsive imaging members comprised of photogenerating layers and hole transport layers, and wherein further the members obtained can be in the form of a belt with seams therein. Examples of generator layers disclosed in these patents are trigonal selenium and phthalocyanines, while examples of transport molecules that may be used include various aryl amines as mentioned therein. Other representative patents disclosing layered photoresponsive imaging members are U.S. Pat. Nos. 4,115,116; 4,047,949; and 4,081,174. These members can be prepared by a number of known methods, the process parameters and order of coating of the layers being dependent on the member desired. Thus, for example, there is described in this prior art and other U.S. patents the preparation of layered imaging members by applying to a conductive substrate containing a hoale blocking layer, a photogenerating layer utilizing solvent coating processes or laminating processes. The imaging members resulting, when provided in the form of a belt, contain seams therein; while in contrast, the imaging members produced in accordance with the process of the present invention are seamless. Imaging member belts with seams therein, while suitable for their intended purposes, have disadvantages associated therewith, including the need to sense the position of the seam to prevent it from passing through an image frame.

Additionally, there is disclosed in U.S. Pat. No. 3,671,617 methods for drawing a tubular thermal plastic resin film comprising transporting the film onto a mandrel which has a particular conical shape, causing the uniform occurrence of necking initiation points around the circumference of the film by drawing the film around the mandrel; and continuing to draw the film by the action of fluid pressure exerted within the film subsequent to the passing of the film over the main mandrel. Other similar teachings are presented in U.S. Pat. Nos. 3,576,051; 3,725,519; 4,118,453; 4,341,729 and 4,062,916.

Additional representative prior art includes U.S. Pat. No. 3,607,998 which discloses methods for obtaining hollow articles wherein a fluidized mass of material is formed, and at least a portion of the periphery of a flexible bladder is contacted with a portion of the fluidized mass in a manner that will enable the material to adhere thereto. Thereafter, the material is integrated into a cohesive unitary generally hollow article, the bladder is at least partially collapsed and is removed therefrom, reference the disclosure in column 1, lines 56 to 75. There is also disclosed in this patent that the material of the fluidized mass is in the form of integrable particles without any added substances, and most desirably the material is a thermoplastic resin, see column 1, lines 67 to 68; and column 2, lines 1 to 9. A similar teaching is present in U.S. Pat. No. 3,698,847, which is a divisional of U.S. Ser. No. 841,121 from which the U.S. Pat. No. 3,607,998, discussed herein, issued. Furthermore, in the abstract of Belgian Patent Publication No. 771,176 there is described a thermoplastic film made by electrostatic deposition of heated thermoplastic particles. Specifically, this abstract discloses a film or sheet prepared by electrostatic deposition of particles of thermoplastic materials on a moving surface, the particles being heated to a temperature sufficient to fuse them into a composite layer which is then separated from the surface prior to or subsequent to solidification of the layer by cooling. The moving surface may be an endless belt or a rotating drum of a copper alloy, stainless steel or chrome steel which is preheated. These references, however, are silent with respect to fabricating seamless substrates, and more particularly for formulating the substrate by powder spraying processes. Also of interest with respect to that aspect of the present invention relating to the removal of the seamless substrates, or seamless photoconductive members from a mandrel by, for example, introducing air through holes situated in the mandrel, are U.S. Pat. No. 1,573,386, and Japanese Patent Publication No. 201640. There is disclosed in the aforementioned documents processes for applying gas pressure from inside a mandrel and through its wall to the interface between a moulded tube or drum and the mandrel for the purpose of separating them. As indicated in column 3, line 25, of the U.S. Pat. No. 1,573,386, air is forced into the mandrel wall causing it to flow between the convolutions of the wire 12, thereby enabling tube 13 to be loosened from the mandrel whereupon it can be easily removed therefrom. Similar teachings are present in U.S. Pat. Nos. 1,036,416; 2,272,704; 2,361,026; 2,384,055; 2,604,658; 2,888,712; and 4,435,531.

Other representative prior art selected as a result of a patentability search include U.S. Pat. Nos. 3,576,928, which discloses a cylindrical member for deposition; 3,148,084, 3,439,649; 3,598,626; 3,676,210; 3,791,341; 3,849,128; 4,073,265; 4,383,020; and 4,481,273.

Although the above processes and resulting photoconductive imaging members formulated in some instances are suitable for their intended purposes, there remains a need for improved processes which are simple in operation, can be accomplished in the absence of a solvent, and which processes have the other advantages as illustrated herein. Further, with the process of the present invention, the seamless photoresponsive imaging member can be prepared without separating the substrate from the mandrel as more fully disclosed hereinafter. Moreover, the electrostatic powder coating process of the present invention has advantages over liquid spray coating techniques. For example, in powder coating processes, organic solvents are not required, and thus the problems arising from volatile organic emissions and hazardous waste disposals are eliminated. Further, with the process of the present invention, there results extremely efficient utilization of materials in that from about 95 percent to about 99 percent of the components selected are consumed in the process. Additionally, with the process of the present invention there results extremely uniform coated layers which is not the situation with many prior art processes. Also, with the powder coating process of the present invention there may be selected insoluble and soluble polymer resins. Furthermore, with the powder coating processes of the present invention ·significant energy reductions are achievable, in that for example, the prefiltered exhaust air emitted from the powder booth apparatus can be recirculated for other uses. Also, it is known that powder coating technology has been used in the painting industry, reference for example a brochure available from Interrad entitled "Powder Coating: Tomorrow's Superstar in Metal Finishing" reprinted from a January 1982 issued of *Modern Metals*. The aforementioned prior art is silent, however, with respect to the use of powder coating processes for affecting the preparation of seamless photoresponsive imaging members.

OBJECTS OF THE INVENTION

It is an object of the present invention to provide powder coating processes for obtaining seamless substrates.

In another object of the present invention there are provided processes for obtaining seamless photoconductive imaging members with powder coating processes.

In a further object of the present invention there are provided processes for generating seamless substrates while simultaneously substantially eliminating pollution hazards associated with several prior art fabrication methods.

In still a further object of the present invention there are provided powder coating processes which enable uniform smooth coatings of components on a mandrel.

Another object of the present invention resides in powder coating processes which are economical and simple in operation for obtaining seamless substrates and corresponding layered photoresponsive imaging members.

An additional object of the present invention resides in electrostatic powder coating processes for generating seamless substrates and corresponding seamless layered photoresponsive imaging members comprised of photogenerating pigments and hole charge transport molecules.

In still a further object of the present invention there are provided processes for affecting the electrostatic powder spraying of resins or blends of resins and pigments onto a mandrel coated with a release agent, and wherein there results seamless substrates.

In still another object of the present invention there are provided powder coating processes for obtaining conductive flexible seamless belts and corresponding flexible seamless layered photoresponsive imaging members.

Also, in a further object of the present invention there are provided electrostatic powder coating processes for formulating seamless document handler belts with positive drive features inclusive of dimples integrally formed thereon.

Additionally, in a further object of the present invention there can be obtained layered photoresponsive imaging members by the formulation of seamless belts in accordance with the process described herein, and thereafter applying in sequence a photogenerating layer and an arylamine hole transport layer.

Furthermore, in an additional object of the present invention there are provided processes for obtaining layered photoresponsive imaging members wherein there is initially formulated a seamless belt followed by removal of the belt from the supporting substrate, and thereafter applying thereto a photogenerating layer and an arylamine hole transport layer.

These and other objects of the present invention are accomplished by the provision of powder coating processes that enable seamless substrates and corresponding seamless layered photoresponsive imaging members. Therefore, in accordance with the present invention, there is provided powder coating processes, accomplished in the absence of solvents, for obtaining flexible seamless substrates, and thereafter corresponding flexible seamless photoresponsive imaging members comprises of photogenerating pigments and hole transport molecules. Alternatively, the powder coating process of the present invention can be selected for the fabrication of conductive flexible seamless substrates, and corresponding flexible layered photoresponsive imaging members. More specifically, in one embodiment of the present invention, there is provided a process for the fabrication of seamless substrates, inclusive of seamless belts, comprising (1) providing a surface, such as a mandrel, to be coated; (2) depositing thereon a release composition; (3) subsequently depositing by electrostatic powder spraying polymeric compositions; (4) affecting melting of the deposited polymer and (5) thereafter cooling the polymer composition.

Another specific process embodiment of the present invention comprises (1) providing a mandrel substrate with a releasing composition thereon, inclusive of fluorocarbon polymers; (2) depositing thereon by electrostatic powder spraying polymers or blends of polymers, and pigment particles; (3) heating the deposited polymer or polymer blend enabling melting thereof; (4) permitting the polymer or polymer blend to cool; and (5) subsequently removing the seamless polymeric substrate generated.

Therefore, layered photoresponsive imaging members can be prepared in accordance with the process of the present invention comprising (1) providing a mandrel containing thereon a release composition; (2) depositing thereon by electrostatic powder spraying a polymer with conductive substances therein, or polymer composition; (3) affecting melting of the polymer composition; (4) subsequent to cooling, depositing on the formed seamless polymer composition substrate a ground plane layer, and a photogenerating layer comprised of photogenerating pigments optionally dispersed in inactive resinous binders; (5) thereafter depositing on the photogenerating layer a hole transport layer comprised of, for example, aryl amine hole transporting molecules dispersed in inactive resinous binders; and (6) removing from the mandrel the seamless layered photoconductive imaging member fabricated.

Moreover, there is provided in accordance with the present invention a process for the fabrication of seamless layered photoresponsive imaging members which comprises (1) providing a substrate in the form of a mandrel, a drum, or a cylinder with a fluorocarbon release component thereon; (2) depositing thereon by electrostatic powder spraying a thermoplastic polymer; (3) melting the thermoplastic polymer by heating; (4) permitting the polymer to cool; (5) applying thereto a conductive ground plane layer comprised of, for example, a conductive material such as carbon black or a metal dispersed in a resinous binder; (6) optionally applying an adhesive layer and a blocking layer; (7) thereafter applying by spray coating a photogenerating layer comprised of photogenerating pigments optionally dispersed in an inactive resinous binder; (8) applying to the photogenerating layer by spray coating a hole transport layer comprised of, for example, aryl amine hole transport molecules dispersed in a resinous binder; and (9) removing from the substrate the resulting fabricated seamless layered photoresponsive imaging member.

BRIEF DESCRIPTION OF THE DRAWINGS

For a further understanding of specific embodiments of the present invention and other features thereof reference is made to the following description wherein.

Figure 1:
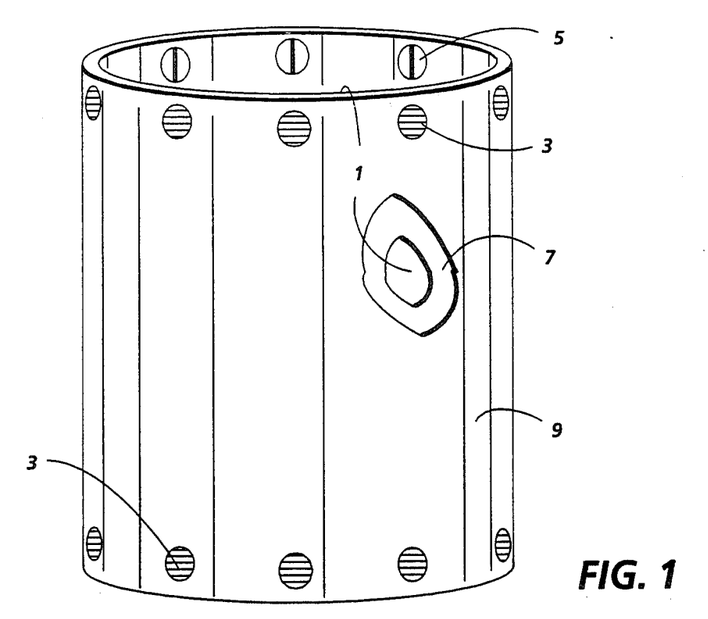
FIG. 1 is a cross-sectional view of a photoresponsive imaging member prepared in accordance with a specific process of the present invention.

Specifically illustrated in FIG. 1 is an aluminum mandrel 1 with removable brass plugs therein 3, including the inside of the plugs 5, which plugs are about 0.5 inches in diameter for a mandrel of 6 inches diameter, and 8.5 inches in length; and wherein eight plugs are situated respectively at the bottom and top of the mandrel; a release composition, preferably comprised of a fluorocarbon polymer with a polymer coated substrate thereover 7 applied by powder spraying, and followed by melting and cooling of the polymer; and a photoconductive member 9 applied by known solvent spraying processes, comprised of ground plane such as a polymer loaded with carbon black, a photogenerating layer, and a hole transport layer. Thus, there can be selected a mandrel of about 8.5 inches in length of an aluminum tube with a thickness 0.25 inches (6,350 microns), followed by the subsequent application of a release composition, and a polymer, or a polymer with conductive components therein, as illustrated herein. During the coating of the photoconductive member, and the polymer or polymer mixture, the threaded plugs are present on the mandrel as illustrated. Subsequently, the polymer, or photoconductive member deposited on the polymer can be removed from the mandrel by initially eliminating the threaded plugs, for example unscrewing these plugs at reference 5; and thereafter directing a stream of air through the holes now present on the mandrel. Other similar separation processes can be selected providing the objectives of the present invention are achievable.

Figure 2:
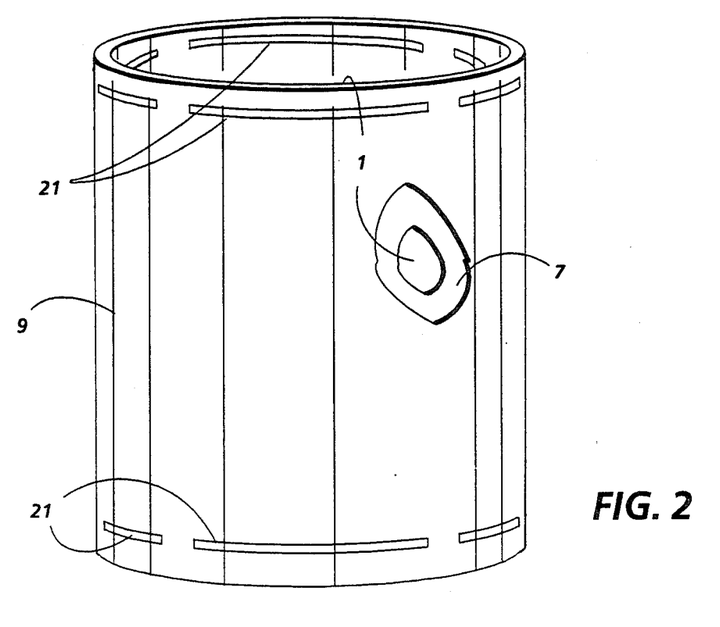
FIG. 2 is a cross-sectional view of a further specific process embodiment of the present invention.

A similar process embodiment is illustrated in FIG. 2, with the exception that there is incorporated into the mandrel rectangular shaped tapered brass plugs 21. These plugs have a curvature corresponding to the outside curvature of the mandrel, and can be removed rather easily by sufficient force applied to the inside or outside plug surface. In this Figure, like reference numbers correspond to those as illustrated in FIG. 1.

Alternatively, and with further reference to the Figures there can be utilized in place of the threaded plugs 3; porous metallic discs or porous metallic sections, respectively, thus avoiding removal of the plugs since the air selected for separation is passed through the porous substances. Also, there can be selected a completely porous metal mandrel. Additionally, to avoid removal of plugs, one can use a mandrel with a number of small diameter holes containing therein two rings permanently inserted into the top and bottom of the mandrels. When it is desired to separate the photoconductive member from the mandrel, the inside rings with small holes therein are turned to line up these holes with corresponding holes in the mandrel enabling the clear passage of air therethrough. These rings may contain pertrusions thereon to permit the aligning of holes to occur. Specifically, for example, there can be selected substrates with porous metal disks, or porous metal slots available from The Mott Metallurgical Corporation. In this embodiment, the pores have a diameter of less than about 40 microns although other pores size openings can be selected depending on the number of pores utilized, for example. In situations wherein rings are inserted into a mandrel, there can be selected a hollow cylinder fabricated from thin flexible metals such as nickel with a wall thickness of from about 125 to about 300 microns. This mandrel would include therein rotatable rings at the top and bottom with holes, which could be aligned, or misaligned with those in the main body of the mandrel. Therefore, during the powder coating and fusing of the seamless substrate the inner rings would be positioned so that the holes are misaligned during the coating process, and subsequently aligned when it is desired to remove the belt from the mandrel.

Substrates that can be selected for the process of the present invention include mandrels, drums, cylinders, and other equivalent configurations providing they are conductive. Examples of specific materials that may be used as the substrates include various metals such as copper, aluminum, stainless steel, nickel and the like. Additionally, there can be selected as the substrate polymers with conductive coatings thereover, inclusive of polyethylene and polypropylene cylinders with a conductive coating thereover of a metal like aluminum. The aforementioned substrates can be of various thickness; generally however, the thickness of this substrate is from about $1 \times 10^2$ microns to about $1 \times 10^4$ microns, and preferably from about $3 \times 10^2$ microns to about $3 \times 10^3$ microns.

The substrate contains thereover a thin coating of a release composition that will permit the polymer, or photoconductive member formed thereover to be easily separated from the mandrel substrate. Various known release agent components can be useed including fluoropolymers, such as Teflon, zinc stearate, nylons, polypropylenes, polyethylenes, polycarbonates, polyesters, polyurethanes, and the like. The release component is present in a layered thickness of from about 0.1 microns to about 100 microns, and preferably is of a thickness of from about 0.5 microns to about 50 microns. Further, the release component can be applied by a number of known techniques including, for example, spraying from an aerosol source onto a rotating, typically from about 100 to about 300 revolutions per minute, mandrel substrate. Alternatively, the release composition can be added to the mandrel substrate by spraying a dispersion thereof present in a suitable liquid, such as methylene chloride, with wet paint spray equipment. Additionally, when selecting release components of a powder composition, they can be electrostatically powder sprayed onto a rotating mandrel surface, and subsequently cured by heating.

For providing the polymer coating, various known processes and apparatuses can be selected inclusive of electrostatic powder coating apparatuses such as the commercially available Voltastatic Solid Spray 90 System.

More specifically, in these known apparatuses generally the polymer powder or other components to be coated are contained in a hopper with an agitating medium therein, such as a fluidizer, thereby preventing powder compacting. Thereafter, air pressure can be selected for the purpose of delivering the powder to an electrostatic gun with, for example, an Venturi tube or connecting plastic tube. Further, the electrostatic gun used has one or more built in electrodes which are raised to a high voltage, typically 30 or 80 kilovolts, thereby enabling the surrounding air to be ionized and formulating a current of at least several microamps of ions of a single polarity. Ionization of the air, which occurs in the aforementioned apparatus is important in that, for example, insulating powder will not charge effectively simply by contacting with a high voltage. Thereafter, the charged, powdered polymer particles travel towards the grounded substrate directed by the air selected to disperse the polymer powder, and the electric force of the charge particles caused by the electric field between the high voltage gun and the substrate. Also, the substrates are generally rotated during the spraying process at various effective speeds inclusive of, for example, from about 60 revolutions per minute to about 500 revolutions per minute; and preferably from about 100 revolutions per minute to about 300 revolutions per minute. Moreover, during the spraying process the gun selected can be traversed either horizontally or vertically depending on the configuration of the rotating substrate and other process parameters. Movement of the gun can be achieved manually or, for example, by use of an automatic reciprocator with a chain driven system or a hydraulic or pneumatic cylinder.

The coating is continued for a sufficient period of time so as to provide a layer of powder or other materials in the desired thickness. This thickness will usually correspond to the diameter of the powder particles or other materials selected as the coating. Thus, for example, when the powder particles have a diameter of from about 30 to about 40 microns, there results a powder coating of from about 30 to 40 microns on the substrate with one coating pass operation. Deposited coating thicknesses, however, are from about 25 microns to about 500 microns, and preferably from about 100 microns to about 250 microns.

Various known polymers can be selected as the coating material inclusive of polyethylenes, polypropylenes, polyvinylchlorides, nylons, such as Nylon 11 and Nylon 12, polyesters, vinylchlorides, polyurethanes, polyphenylene sulfides, and fluoropolymers inclusive of polytetrafluoroethylenes (Teflon ®). Other equivalent polymeric thermoplastics can be selected providing the objectives of the present invention are achievable. Polymers that provide toughness, impact resistance, high chemical resistance, high temperature resistance, flexibility, or durability properties are some of the criteria used in determining the specific polymer to be coated on the substrate. Additionally, there may be selected thermosetting polymers, inclusive of epoxies, polyester cured epoxies, and urethane acrylics, which polymers after powder spraying are exposed to heat to induce crosslinking thereby premitting coating toughness, flexibility, and chemical resistance. Specifically, thus for example seamless substrates may be obtained which are resistent to physical damage, by scratching, or by contact with another object; accordingly there can be utilized as the polymer to be coated an epoxy resin such as VEDOC VE-101, available from the Ferro Corporation. In those situations where a seamless substrate which is resistant to chemicals such as organic solvents, acids, and the like are to be formulated preferred polymers that can be selected include polyethylene sulfide, available as PPS Pro-1 from Nacoplastics Corporation. Further, in situations wherein a seamless substrate that will not degrade when exposed to high temperatures over extended time periods is desired there can be used a fluorinated ethylene propylene powder coating resin inclusive of FEP-2001 available from LMP Corporation. Additionally, a polyamide powder component such a Nylon 12, and polyesters available as Pulvalure 156, can be selected when seamless substrates are desired that can be cycled for a number of times around a small diameter roller without sustaining any mechanical damage.

Subsequently, in accordance with the process of the present invention, the deposited polymer is cause to melt. Melting can be affected by a number of known means, inclusive of heat, infrared radiation, infrared heating lamps, hot air, quartz heaters, microwave heating, and induction heating. The heating temperature is dependent on the thermoplastic or thermoset polymers selected, that is, the temperature will correspond to the melting point of the coating material to be used. Generally, however, the melting temperature is from about 100 degrees Centigrade to about 400 degrees Centigrade. Specifically, the melting temperature applied for some specific polymers is as follows:

| Polymer | Melting Temperature Degrees Centigrade |
| --- | --- |
| Nylon 11 | 190° C. |
| Nylon 12 | 172° C. |
| Polypropylene | 167° C. |
| Polyethylene | 140° C. |
| Polyvinylchloride | 170° C. |
| Epoxies | 90° C. to 108° C. |
| Polyester Cured Epoxies | 140° C. to 200° C. |
| Polyurethanes | 176° C. |

When polymers with conductive substances therein are selected for affecting the electrostatic powder spraying, substantially similar melting temperatures are selected. Thus, for example, with blends or mixtures of thermoplastics and carbon black pigments the melting temperature is from about 100 degrees Centigrade to about 290 degrees Centigrade, and preferably from about 110 degrees Centigrade to about 190 degrees Centigrade. Examples of mixtures include the addition of conductive substances to the aforementioned thermoplastics and thermosetting polymers. Conductive substances present in an effective amount, including from about 20 to about 50 percent by weight, that may be selected include carbon black, nigrosine dyes, and metals such as zinc aluminum, silver nickel steel, the transition metal oxides, transition metal halides, polypyrrole, polyacetylene, and the like.

Preferably, as polymer mixtures there can be selected various mixtures of the polymers mentioned hereinbefore, which mixtures could contain, for example, from about 1 percent to about 50 percent by weight and preferably 30 percent by weight of the conductive substances such as carbon black. A particularly preferred conductive polymer blend is a polyamide (Nylon 12) loaded with 25 percent by weight of carbon black available from Emser as W5941 blend. The aforementioned powder caoted conductive polymer mixtures can be applied by a number of suitable processes wherein there is electrically isolated the powder container from ground. In this manner the powder charging electrodes present in the coating gun do not have a conductive path to ground via the powder, therefore avoiding an electrical short circuit. In this embodiment, because of the high voltages present on the container during the spraying process, about 30 to about 80 kilovolts, a metal guard is provided around the container. Thus, the process conditions for applying the polymers with conductive components therein are similar to those as selected in the electrostatic spraying of conductive paints.

Subsequent to melting of the polymer or other coating component disclosed herein, cooling is accomplished to room temperature by various known processes such as quenching in water, air cooling, or simply permitting the polymer or polymer blend to remain at room temperature. There thus results without the use of solvents a flexible seamless polymeric substrate which can then be used as a supporting substrate layer for a photoconductive imaging member.

There are many advantages associated with eliminating the seam from a flexible photoreceptor belt. A seamed belt requires control hardware to sense or track the seam to ensure that it does not disturb the copy quality by appearing in the exposure area. In a seamless belt, which results with the process of the present invention, this control hardware can be eliminated thus reducing the overall cost of manufacturing the photocopying machine. Also, a seamed belt requires a dead cycle to locate the timing hole and index the seam. This dead cycle is not required if the photoreceptor belt is seamless. Some of the charging, cleaning and vibration problems which occur in a photocopying machine are associated with the photoreceptor seam - subsystems interactions. A large number of these problems can be eliminated if a seamless photoreceptor belt is used. Additionally, in a photocopying machine it is often desirable to avoid using repeatedly the identical photoreceptor belt section to produce a latent image, which is accomplished with a seamless photoreceptor permitting random use of the surface thus extending the usable life of the belt. Moreover, a seamless photoreceptor belt enables any size copy to be produced by sequential passes of the belt.

The mandrel designs as illustrated in FIGS. 1 and 2 can be used to aid in removal of the completed belt. The hollow aluminum mandrel, shown in FIG. 1, has removable plugs at both ends. These plugs are in position during the spraying and curing of the belt. Once the belt has been formed, the plugs are removed from the inside, the mandrel is capped at both ends and air pressure is applied (via a connection on one of the caps) so as to lift and release the belt from the mandrel surface. The air pressure is then released, the end caps removed and the belt is easily slipped off of the mandrel.

Flexible, seamless photoresponsive imaging members can then be prepared by applying to the seamless polymeric substrate formed in accordance with the aforementioned process, a ground plane layer, a photogenerating layer and a hole transport layer. Similar imaging members can be fabricated by initially applying a conductive layer to the seamless substrate generated, optionally applying adhesive and/or blocking layers; and subsequently depositing thereon a ground plane layer, a photogenerating layer and a hole transport layer. Ground planes that can be selected include those comprised of polymers, such as polycarbonates available as Makrolon, polyesters, with conductive components therein including carbon black, graphite, metal flakes like aluminum, carbon fibers; conductive component coatings of Polaroid ICP-117, available from Polaroid Corporation, and the like. The conductive components are present in the polymer in an effective amount, including for example from about 20 to about 50 percent by weight, and preferably about 30 percent by weight. Additionally, the thickness of the ground plane is dependent on a number of factors including the thickness of the other layers present in the photoconductive imaging member; generally, however, a thickness of from about 5 to about 20 microns is selected. Also, there can be selected as a ground plane other known components, such as vacuum evaporated aluminum, present in a thickness of less than about 1 micron.

Hole blocking layers that may be selected for the imaging member include metal oxides comprised of various suitable known materials such as aluminum oxide and the like. The primary purpose of this layer is to provide hole blocking, that is, to prevent hole injection from the substrate during and after charging thereof. Typically, this layer is of a thickness of less than 50 Angstroms.

Examples of adhesive layers that may be selected for the image member include polymer materials such as polyesters, polyvinylbutyral, polyvinylpyrrolidine, and similar equivalent compositions. Typically, this layer is of a thickness of less than about 0.3 microns.

The photogenerating layer may be comprised of known photogenerating pigments, optionally dispersed in resinous binder compositions. Examples of photogenerating pigments include amorphous selenium alloys, halogen doped amorphous selenium, halogen doped amorphous selenium alloys, trigonal selenium, mixtures of Groups 1A and 2A elements, selenide and carbonates with trigonal selenium, reference U.S. Pat. Nos. 4,232,102; and 4,233,283, the disclosure of each of these patents being totally incorporated herein by reference; cadmium sulfide, cadmium selenide, cadmium telluride, cadmium sulfur selenide, cadmium sulfur telluride, metal phthalocyanines, metal free phthalocyanines, vanadyl phthlocyanines, and the like. Alloys of selenium that may be selected for the imaging member fabricated in accordance with the process of the present invention include selenium tellurium alloys, selenium arsenic alloys, selenium tellurium arsenic alloys, and preferably such alloys with a halogen material such as chlorine present in an amount of from about 50 to about 200 parts per million.

The photogenerating layer can be comprised of 100 percent of the photogenerating pigment or these pigments can be dispersed in various suitable inorganic or resinous polymeric binders in amounts of from about 5 percent by volume to about 95 percent by volume, and preferably in amounts of from about 25 percent by volume to about 75 percent by volume. Illustrative examples of polymeric binder resinous materials that can be selected include those as disclosed, for example, in U.S. Pat. No. 3,121,006, the disclosure of which is totally incorporated herein by reference; polyesters, polyvinylbutyral, Formvar, polycarbonate resins, polyvinylcarbazole, epoxy resins, phenoxy resins, especially the commercially available poly(hydroxyether) resins, and the like. This layer typically has a thickness of from about 0.05 microns to about 10 microns or more, and preferably is of thickness of from about 0.4 microns to about 3 microns; however, the thickness of this layer is primarily dependent on the photoconductive volume loading, which may be from 5 to 100 volume percent. Generally, this layer is provided in a thickness which will absorb about 90 percent or more of the incident radiation directed thereon in the imagewise or exposure step of the xerographic imaging process.

The charge transport layer can be comprised of a number of numerous suitable materials which are capable of transporting holes, this layer generally having a thickness in the range of from about 5 microns to about 50 microns, and preferably from about 20 microns to about 40 microns. In a preferred embodiment, this transport layer comprises molecules of the formula:

dispersed in a highly insulating and transparent organic resinous binder wherein X is selected from the group consisting of alkyl, and halogen, inclusive of (ortho) $CH_3$, (meta) $CH_3$, (ortho) CI, (meta) CI, (para) CI.

Compounds corresponding to the above formula include, for example N,N'-diphenyl-N,N'-bis(alkylphenyl)-[1,1-biphenyl]-4,4'-diamine wherein the alkyl is selected from the group consisting of methyl such as 2-methyl, 2-methyl and 4-methyl, ethyl, propyl, butyl, hexyl and the like. With chloro substitution, the amine is N,N'-diphenyl-N,N'-bis(halo phenyl)[1,1'-biphenyl]-4,4'-diamine wherein the halo atom is 2-chloro, 3-chloro or 4-chloro.

Other electrically active small molecules which can be dispersed in the electrically inactive resin to form a layer which will transport holes include bis(4-diethylamine-2-methylphenyl) phenylmethane; 4',4''-bis(diethylamino)-2',2''-dimethyltriphenyl methane; bis-4 (diethylamino phenyl) phenylmethane; and 4,4'-bis (diethylamino)-2,2'-dimethyl triphenylmethane.

Examples of resinous binder materials that may be selected for the transport molecules include those as described in U.S. Pat. No. 3,121,006, the disclosure of which is totally incorporated herein by reference. Specific examples of organic resinous materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binder materials are polycarbonate resins having a molecular weight ($m_w$) of from about 20,000 to about 100,000 with a molecular weight in the range of from about 50,000 to about 100,000 being particularly preferred. Generally, the resinous binder contains from about 10 to about 75 percent by weight of the active material corresponding to the foregoing formula, and preferably from about 35 percent to about 50 percent of this material.

With the imaging members fabricated in accordance with the process of the present invention, the photogenerating layer can be situated between the supporting substrate and an amine hole transport layer; or alternatively the amine hole transport layer may be situated between the photogenerating layer and the supporting substrate. In those situations wherein the photogenerating layer is the top layer, a positive imaging sequence is selected while when the amine hole transport layer is the top layer, a negative imaging sequence is utilized.

With further respect to the process of the present invention, the coating of the polymer or other component on the mandrel can alternatively be accomplished on the inside circumference thereof enabling for more efficient and effective removal of the polymer thereof. In the later process the inside highly polished surface of the mandrel, or cyclinder contains thereon a thin coating of a release composition that permits the polymer formed thereover to be easily separated from the substrate. Generally, the release component in this embodiment can be applied by a number of known techniques including, for example, spraying from an aerosol source into a rotating, typically from about 100 to about 300 revolutions per minute, mandrel substrate. Therafter, an electrostatic powder coating gun is traversed several times through the center of the hollow rotating cyclindral mandrel, thus enabling a uniform layer of powder polymer on the inside circumference. This coated mandrel is then heated to a sufficient temperature to effect the melting of the polymer applied, and subsequently the mandrel is cooled to room temperature. Thereafter, the thermoplastic, or thermosetting polymer selected can be removed from the mandrel by heating the outside surface of the mandrel while cooling the inside surface resulting in the shrinking of the polymer belt formed. A photoconductive imaging member can then be prepared as illustrated herein; or alternatively, the photoconductive imaging member can be prepared without removing the polymer.

The following examples are being supplied to further define various species of the present invention, it being noted that these examples are intended to illustrate and not limit the scope of the present invnetion. Parts and percentages are by weight unless otherwise indicated.

EXAMPLE I

A hollow, cylindrical, aluminum mandrel having threaded removable brass plugs at both ends, and with the dimensions shown in FIG. 1 was precoated with a release agent of Teflon ® in a thickness of 5 microns (CROWN 6075, Dry Film Lubricant and Mold Release Agent, TFE). The threaded brass plugs were in the position as illustrated in FIG. 1 during this precoating step, and were adjusted so that they were level with the surface of the aluminum mandrel. With the plugs still in position, the mandrel was connected to an air motor by means of an adaptor and rotated at approximately 300 rpm. The mandrel was electrically grounded through an air motor casing. Using a Volstatic Solid Spray 90 electrostatic powder coating unit the mandrel was manually sprayed with Nylon 11 powder (RILSAN, NAT ES, RDP-15/10). An even coating of powder was achieved with five hand passes of the spray gun. The powder coated mandrel was then removed from the air motor assembly and suspended horizontally in a forced air curing oven at 220 degrees Centigrade for 16 minutes thus melting, and fusing the Nylon 11 and forming a seamless belt around the mandrel. The Nylon coated mandrel was removed from the oven and water quenched. The brass plugs were then unscrewed from the inside of the mandrel leaving holes behind the belt. Caps having O-ring seals were placed on both ends of the mandrel so as to form a seal around the edges of the belt and C-clamps were used to keep the caps in position. One of the mandrel caps has a compressed air connection and variable pressure relief valve set at 20 psi. The mandrel was then connected to a compressed air line and the pressure gradually increased to 15 psi. The air pressure which was now being applied behind the belt was enough to stretch the Nylon slightly so as to break the weak adhesive bond between the inside of the belt and the surface of the mandrel. Thereafter, the air pressure was released and the mandrel end caps were removed permitting the seamless Nylon 11 belt to be easily slipped off the mandrel. Thickness measurements taken around the circumference of the seamless belt indicated that it was extremely uniform (Mean Thickness=113 plus/minus 5 microns).

EXAMPLE II

The procedure of Example I was repeated with the exception that in place of the Nylon 11 powder there was selected Nylon 12 powder (HUELS, X2805, 40 to 50 microns diameter particle size) to coat the mandrel and the curing cycle was 205 degrees Centigrade for 17 minutes. The procedures used for forming and removing the Nylon 12 belt were identical to those outlined in Example I, and the seamless belt was easily slipped off the mandrel. Thickness measurements taken around the circumference of the Nylon 12 seamless belt indicated that it was extremely uniform (Mean Thickness=100 plus/minus 3 microns).

EXAMPLE III

A hollow, cylindrical, aluminum mandrel having tapered removable brass plugs at both ends and having the dimensions shown in FIG. 2 was precoated with a Teflon ® release agent in a thickness of 5 microns (CROWN 6075, Dry Film Lubricant and Mold Release Agent, TFE). The tapered plugs were in position during the precoating step and were adjusted so that they were level with the surface of the aluminum mandrel. With the plugs still in position the mandrel was connected to the drive air motor of an automatic coating unit. The mandrel was rotated at 200 rpm while the Volstatic powder gun, which was connected to a reciprocating pneumatic cylinder, was automatically moved up and down. The gun to mandrel distance was maintained at 15 centimeters. An even coating of Nylon 12 powder (HUELS, X2805, 40 to 50 microns particle size) was achieved with six passes of the gun. Thereafter, the powder coated mandrel was then removed from the air mtor assembly and suspended horizontally in a Sunkiss thermoreactor type curing oven maintained at a temperature of 220 degrees Centigrade. After a period of 9 minutes, the mandrel was removed from the oven and allowed to air cool to room temperature. The tapered plugs were then removed from the inside of the mandrel leaving holes behind the belt. Caps having O-ring seals were placed on both ends of the mandrel so as to seal around the edges of the belt and C-clamps were used to keep the caps in position. The mandrel was connected to a compressed air line and the pressure increased to 15 psi which air pressure was sufficient to stretch the Nylon slightly so as to break the weak adhesive bond between the inside of the belt and the surface of the mandrel. Subsequently, the air pressure was released and the mandrel end caps removed. The seamless Nylon 12 belt was then easily removed manually from the mandrel. Thickness measurements taken with a micrometer around the circumference of the belt indicated that it was extremely uniform (Mean Thickness—73 plus/minus 2 microns)

EXAMPLE IV

A layered photoresponsive imaging member was prepared by initially applying to the Nylon 11 seamless belt obtained in accordance with the process of Example I, a ground plane conductive layer coating a polymer available from Polaroid Corporation as Polaroid ICP-117, which is a processable-polypyrrole polymer complex. This complex was dispersed in trichloroethane, about 10 percent solids content, by ballmilling for 24 hours. This dispersion was spray coated with a Binks Spray Coat Apparatus Gun, onto the Nylon 11, to a dry thickness of 2 microns (dry thickness), and subsequently dried in a oven at 80 degrees Centigrade. The surface resistance of the ground plane, as determined by a surface resistence meter, was 104 ohms/square.

Thereafter, trigonal selenium, 25 percent by weight, was dispersed in polyvinyl carbazole, 75 percent by weight, and applied as a photogenerating layer over the above ground plane by spray coating from a tetrahydrofuran (60 percent) toluene (40 percent) solvent mixture. The resulting device was then dried in an oven for 10 minutes at 100 degrees Centigrade. A photgeneratoring layer in a thickness of 1 micron was obtained.

There was then spray coated, from a methylene chloride (60 percent by weight), 1,1,2-trichloroethane solvent mixture with the Binks sprayer a transport layerr in a dry thickness of 25 microns, comprised of 40 percent by weight of N,N'-diphenyl-N,N'-bis(3-methylphenyl)1,1'-biphenyl4,4'-diamine, dispersed in 60 percent by weight of polycarbonate. This layer was dried in an oven for 25 minutes at 135 degrees Centigrade.

After cooling the above prepared photoconductive device, it was electrically tested in an electrical scanner by applying to the device from a corotron 5 kilovolts enabling the device to charge to 1,000 volts. This device discharged to a residual potential of 50 volts at a discharge energy of 5 ergs/cm$^2$. The former electrical testing was continued for 50,000 imaging cycles, after which the residual voltage increased to only 80 volts, and the charge continued at 1,000 volts. This data indicates that the photoconductor tested will form latent images in a xerographic imaging apparatus.

Other modifications of the present invention may occur to those skilled in the art based upon a reading of the present disclosure and these modifications are intended to be included within the scope of the present invention.

What is claimed is:

1. A process for the fabrication of seamless substrates which comprises (1) providing a substrate with a release coating composition thereover; (2) depositing thereon by electrostatic powder spraying a polymer; (3) melting the polymer; (4) cooling the melted polymer; and (5) subsequently separating the formed seamless substrate.

2. A process in accordance with claim 1 wherein the substrate is in the form of a mandrel, a drum or a cylinder.

3. A process in accordance with claim 1 wherein the substrate is comprised of a metal.

4. A process in accordance with claim 1 wherein the substrate is comprised of a metal selected from the group consisting of copper, aluminum, nickel, and stainless steel.

5. A process in accordance with claim 1 wherein the substrate is comprised of a conductive polymer.

6. A process in accordance with claim 5 wherein the conductive polymer is comprised of polyethylene with a coating thereover of aluminum.

7. A process in accordance with claim 5 wherein the conductive polymer is polypropylene having dispersed therein aluminum.

8. A process in accordance with claim 1 wherein the release coating is a fluorocarbon polymer.

9. A process in accordance with claim 1 wherein the deposited polymer is a thermoplastic.

10. A process in accordance with claim 9 wherein the thermoplastic is selected from the group consisting of polyethylenes, polypropylenes, and polyamides.

11. A process in accordance with claim 1 wherein the polymer is a thermosetting resin selected from the group consisting of epoxies, polyester cured epoxies, and urethane acrylics.

12. A process in accordance with claim 8 wherein the fluorocarbon polymer is polytetrafluoroethylene.

13. A process in accordance with claim 1 wherein the polymer is melted by heating.

14. A process in accordance with claim 13 wherein the heating is accomplished at a temperature in excess of 50 degrees Centigrade.

15. A process in accordance with claim 1 wherein a conductive polymer mixture is selected.

16. A process in accordance with claim 15 wherein the mixture is comprised of a conductive component dispersed in a polymer.

17. A process in accordance with claim 16 wherein the conductive component is selected from the group consisting of carbon black and metallic materials.

18. A process in accordance with claim 17, wherein the metallic material is aluminum.

19. A process for the fabrication of layered seamless photoresponsive imaging members which comprises (1) providing a substrate with a release coating composition thereover; (2) depositing thereon by electrostatic powder spraying a polymer; (3) melting the polymers; (4) subsequently permitting the melted polymer to cool, followed by separating the seamless substrate formulated; (5) thereafter applying a ground plane layer thereto; and (6) depositing thereon a photogenerating layer and a charge transport layer.

20. A process in accordance with claim 19 wherein the photogenerating layer is applied prior to deposition of the charge transport layer.

21. A process in accordance with claim 19 wherein the hole transport layer is applied to deposition of the photogenerating layer.

22. A process in accordance with claim 19 wherein the polymer is a thermoplastic resin.

23. A process in accordance with claim 19 wherein the polymer is a thermosetting plastic.

24. A process in accordance with claim 22 wherein the thermoplastic is selected from the group consisting of polyethylene, polypropylene, polyvinylchloride, and polyamide.

25. A process in accordance with claim 23 wherein the thermosetting resin is an epoxy, a polyester cured epoxy, or a urethane acrylic resin.

26. A process in accordance with claim 19 wherein the release coating is a fluorocarbon polymer.

27. A process in accordance with claim 26 wherein the polymer is polytetrafluoroethylene.

28. A process in accordance with claim 19 wherein there is selected a polymer mixture.

29. A process in accordance with claim 28 wherein the polymer mixture is comprised of a thermoplastic resin and a conductive component.

30. A process in accordance with claim 29 wherein the conductive component is carbon black or a metal.

31. A process in accordance with claim 19 wherein the polymer is applied by an electrostatic powder coating apparatus.

32. A process in accordance with claim 31 wherein the polymer which is positively charged is electrostatically attracted to the substrate which is negatively charged.

33. A process in accordance with claim 19 wherein the photogenerating layer is comprised of photogenerating pigments selected from the group consisting of inorganic pigments and organic pigments.

34. A process in accordance with claim 33 wherein the inorganic photogenerating pigments are selected from the group consisting of selenium, selenium alloys, and trigonal selenium.

35. A process in accordance with claim 33 wherein the organic pigments are selected from the group consisting of metal phthalocyanines, metal free phthalocyanines, and vanadyl phthalocyanine.

36. A process for the fabrication of layered seamless photoresponsive imaging members which comprises (1) providing a substrate with a release coating composition thereover; (2) depositing thereon by electrostatic powder spraying a polymer; (3) melting the polymer; (4) subsequently permitting the melted polymer to cool; (5) separating the seamless substrate formed and thereafter applying a ground plane layer thereto; and (6) depositing thereon in sequence a photogenerating layer and a charge transport layer.

37. A process in accordance with claim 36 wherein the photogenerating layer is applied prior to deposition of the hole transport layer.

38. A process in accordance with claim 36 wherein the hole transport layer is applied prior to deposition of the photogenerating layer.

39. A process in accordance with claim 36 wherein the polymer is a thermoplastic resin.

40. A process in accordance with claim 36 wherein the polymer is a thermosetting resin.

41. A process in accordance with claim 39 wherein the thermoplastic is selected from the group consisting of polyethylene, polypropylene, polyvinylchloride, and polyamide.

42. A process in accordance with claim 40 wherein the thermosetting resin is an epoxy, a polyester cured epoxy, or a urethane acrylic resin.

43. A process in accordance with claim 36 wherein the release coating is a fluorocarbon.

44. A process in accordance with claim 43 wherein the release coating is polytetrafluoroethylene.

45. A process in accordance with claim 36 wherein there is selected a polymer mixture.

46. A process in accordance with claim 45 wherein the polymer mixture is comprised of a thermoplastic resin and a conductive component.

47. A process in accordance with claim 46 wherein the conductive component is carbon black or a metal.

48. A process in accordance with claim 36 wherein the polymer is applied by an electrostatic powder coating apparatus.

49. A process in accordance with claim 48 wherein the polymer which is positively charged is electrostatically attracted to the substrate which is negatively charged.

50. A process in accordance with claim 36 wherein the photogenerating layer is comprised of photogenerating pigments selected from the group consisting of inorganic pigments and organic pigments.

51. A process in accordance with claim 50 wherein the inorganic photogenerating pigments are selected from the group consisting of selenium, selenium alloys, and trigonal selenium.

52. A process in accordance with claim 50 wherein the organic pigments are selected from the group consisting of metal phthalocyanines, metal free phthalocyanines, and vanadyl phthalocyanine.

53. A process for the fabrication of layered seamless photoconductive imaging members which comprises (1) providing a supporting substrate with a release coating composition thereover; (2) depositing thereon by electrostatic powder spraying a polymer or polymer blend; (3) melting the polymer; (4) subsequently permitting the melted polymer to cool, followed by separating the seamless substrate formulated; (5) thereafter applying a carbon black layer followed by a phenolic resin blocking layer, a photogenerating layer of trigonal selenium, and thereover an arylamine hole transport layer of the formula wherein X is selected from the group consisting of alkyl and halogens.

54. A process in accordance with claim 1 wherein the substrate includes as an integral part thereof passages.

55. A process in accordance with claim 54 wherein the passages are in the form holes.

56. A process in accordance with claim 54 wherein there is selected rectangular shaped passages.

57. A process in accordance with claim 54 wherein air is circulated through the passages thereby enabling separation of the substrate from the mandrel.

58. A process for the fabrication of layered seamless photoresponsive imaging members consisting essentially of (1) providing a substrate with a release coating composition thereover; (2) depositing thereon by electrostatic powder spraying a polymer; (3) melting the polymer; (4) subsequently permitting the melted polymer to cool; (5) separating the seamless substrate formed; (6) thereafter applying a ground plane layer thereto; and (7) depositing thereon a photogenerating layer and a charge transport layer.

* * * * *